(12) United States Patent
Chen et al.

(10) Patent No.: US 8,345,964 B2
(45) Date of Patent: Jan. 1, 2013

(54) IMAGE GENERATION METHOD, DEVICE, AND IMAGE SYNTHESIS EQUIPMENT

(75) Inventors: Hai Chen, Shenzhen (CN); Haiqin Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1139 days.

(21) Appl. No.: 12/284,317

(22) Filed: Sep. 19, 2008

(65) Prior Publication Data

US 2009/0080791 A1 Mar. 26, 2009

(30) Foreign Application Priority Data

Sep. 20, 2007 (CN) .......................... 2007 1 0152256

(51) Int. Cl.
 *G06K 9/00* (2006.01)
 *G09G 5/02* (2006.01)
 *H04N 11/20* (2006.01)
 *H04N 7/01* (2006.01)
(52) U.S. Cl. .......................... 382/162; 345/589; 348/453
(58) Field of Classification Search .......................... None
 See application file for complete search history.

(56) References Cited

U.S. PATENT DOCUMENTS

| | | | |
|---|---|---|---|
| 6,747,694 B1 * | 6/2004 | Nishikawa et al. | 348/229.1 |
| 7,508,421 B2 * | 3/2009 | Tamaru et al. | 348/229.1 |
| 7,825,969 B2 * | 11/2010 | Tico et al. | 348/273 |
| 2002/0145667 A1 * | 10/2002 | Horiuchi | 348/207.99 |
| 2005/0013501 A1 * | 1/2005 | Kang et al. | 382/254 |
| 2006/0133688 A1 * | 6/2006 | Kang et al. | 382/254 |
| 2008/0267530 A1 * | 10/2008 | Lim | 382/284 |

* cited by examiner

*Primary Examiner* — Randolph I Chu

(74) *Attorney, Agent, or Firm* — Huawei Technologies Co., Ltd.

(57) ABSTRACT

An image generation method, image generation device, and image synthesis device include generating at least two images at different exposure times. Intensities of pixels in the images at different exposure times are respectively obtained. Reliabilities of the pixels in the images at different exposure times are respectively obtained. The intensities of the corresponding pixels in the images at different exposure times are respectively multiplied by the corresponding reliabilities, and then the products are summed, so as to obtain intensities of pixels in a synthesized image and thus generate the synthesized image. By using the technical schemes of the present disclosure, an image with abundant details can be generated in real time.

22 Claims, 6 Drawing Sheets

```
┌─────────────────────────────────────────────────┐
│ Generate at least two images with different     │──401
│ exposure time                                   │
└─────────────────────────────────────────────────┘
                        │
                        ▼
┌─────────────────────────────────────────────────┐
│ Correct intensities to be corrected of pixels   │
│ in the images with different exposure time,    │
│ obtain corrected intensities of the pixels in  │──402
│ the images with different exposure time, and   │
│ calculate intensities of pixels in a synthesized│
│ image by adopting a constant parameter          │
│ weighting method                                │
└─────────────────────────────────────────────────┘
```

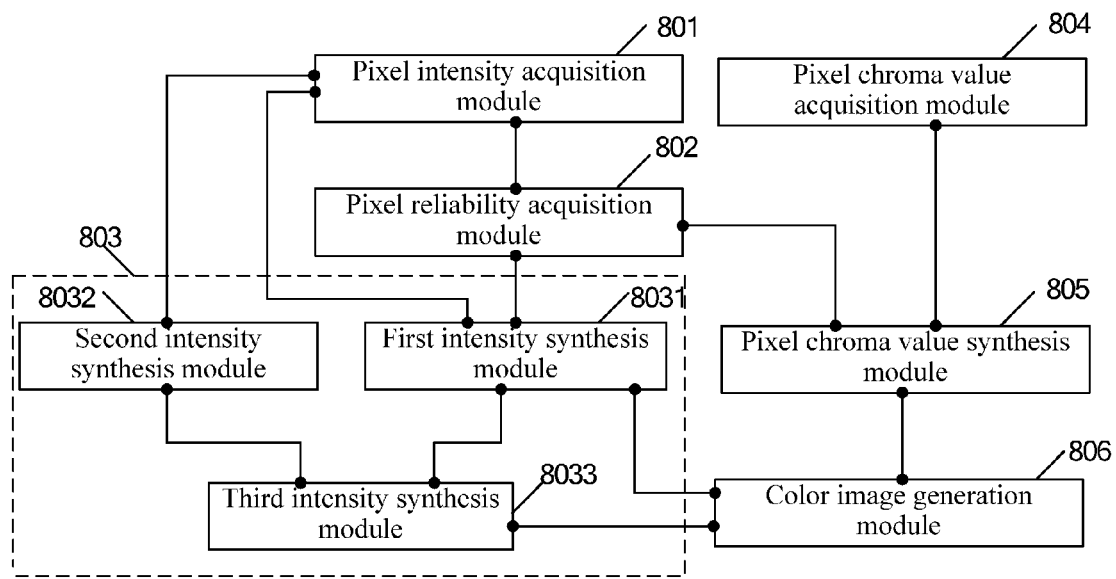
FIG. 8
FIG. 9-A

FIG. 9-B
FIG. 9-C
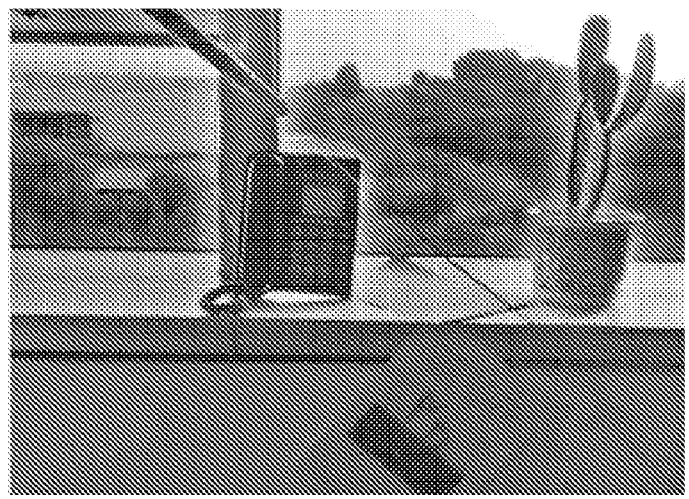
FIG. 9-D

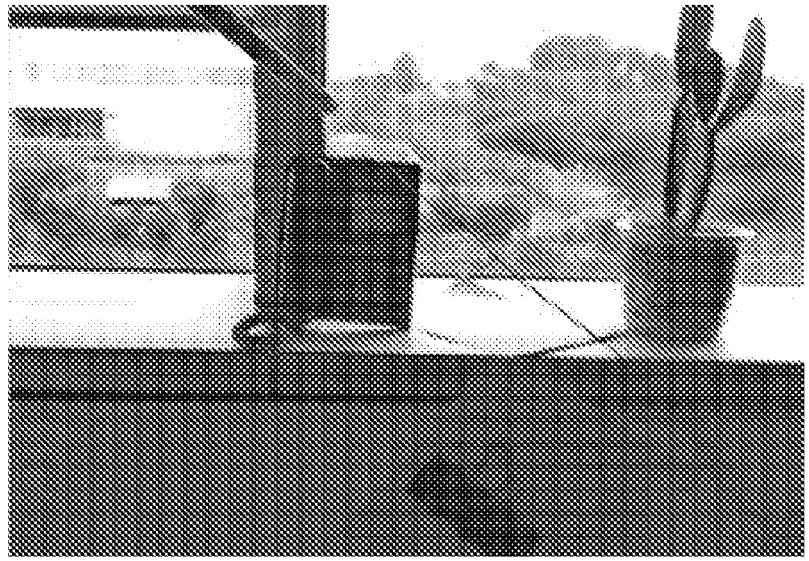
FIG. 9-E
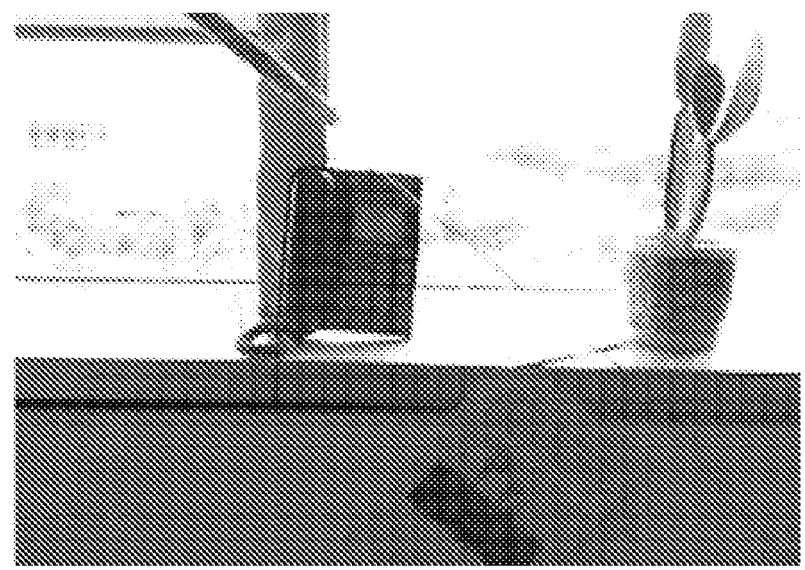
FIG. 9-F

IMAGE GENERATION METHOD, DEVICE, AND IMAGE SYNTHESIS EQUIPMENT

CROSS-REFERENCE TO RELATED APPLICATIONS

This application claims the benefit and priority of Chinese Application No. 200710152256.4, filed Sep. 20, 2007. The entire disclosure of the above application is incorporated herein by reference.

FIELD

The present disclosure relates to an image processing technical field, and more particularly to an image generation method, device, and image synthesis equipment.

BACKGROUND

This section provides background information related to the present disclosure which is not necessarily prior art.

In reality scene, the dynamic range perceived by human eyes is quite large. The human eyes may sense starlight with a brightness of $10^{-3}$ cd/m$^2$ and sunlight with a brightness of $10^5$ cd/m$^2$, and may even sense details in a reality scene under a very dark or bright circumstance. With a relatively small brightness dynamic range, the current image capturing equipment cannot perceive bright details in an extremely bright scene, nor perceive dark details in an extremely dark scene. Therefore, the brightness dynamic range perceived by the image capturing equipment is much smaller than the brightness dynamic range in an actual scene perceived by the human eyes.

During the research and practice of the prior art, the inventor finds out it is highly desirable to simplify and improve the image synthesizing process and generate a video image in real time.

SUMMARY

This section provides a general summary of the disclosure, and is not a comprehensive disclosure of its full scope or all of its features.

In order to solve the above technical problems, the present disclosure is directed to an image generation method, device, and an image synthesis equipment in the following embodiments, so that a video image with abundant details is generated in real time.

Accordingly, in an embodiment of the present disclosure, an image generation method is provided. The method includes: generating at least two images at different exposure time; obtaining intensities of pixels in the images at different exposure time respectively; obtaining reliabilities of the pixels in the images at different exposure times respectively; obtaining a intensity of the pixels in a synthesized image depending on the intensities and the reliabilities of the pixels in the images with different exposure time; and generating an image depending on the intensity of the pixels in the synthesized image. In another embodiment of the present disclosure, an image generation device is provided.

The image generation device includes: an image capturing module configured to generate at least two images at different exposure times; a pixel intensity acquisition module configured to obtain intensities of pixels in the images at different exposure times; a pixel reliability acquisition module configured to obtain reliabilities of the pixels in the images at different exposure times; and a pixel intensity synthesis module configured to obtain an intensity of the pixels in a synthesized image depending on the intensities and the reliabilities of the pixels in the images at different exposure times.

In yet another embodiment of the present disclosure, an image generation device is provided. The image generation includes: a pixel intensity acquisition module configured to obtain intensities of pixels in the images at different exposure times; a pixel reliability acquisition module configured to obtain reliabilities of the pixels in the images at different exposure times; and a pixel intensity synthesis module configured to multiply intensities of the pixels in the images at different exposure times by the corresponding reliabilities respectively and sum the products to obtain an intensity of the pixels in a synthesized image.

These and other features will be more clearly understood from the following detailed description taken in conjunction with the accompanying drawings and claims.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

The present disclosure will become more fully understood from the detailed description given herein below for illustration only, and thus are not limitative of the present disclosure, and in which:

FIG. 8 is a schematic diagram of an embodiment of an image generation system;

FIG. 9-A shows a long exposure image generated depending on an embodiment of the present disclosure;

FIG. 9-B shows a short exposure image generated depending on an embodiment of the present disclosure;

FIG. 9-C shows a synthesized image obtained by a constant parameter weighting method of corrected intensities depending on an embodiment of the present disclosure;

FIG. 9-D shows a synthesized image obtained by a reliable weighting method adopting Gaussian weights of intensities to be corrected as reliabilities depending on an embodiment of the present disclosure;

FIG. 9-E shows a synthesized image obtained by a mixed weighting method depending on an embodiment of the present disclosure; and FIG. 9-F shows a synthesized image obtained by a Logitech automatic exposure technique.

DETAILED DESCRIPTION

Example embodiments will now be described more fully with reference to the accompanying drawings.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In one embodiment of the present disclosure, an image generation method is provided. The method includes the following: at least two images at different exposure times may be generated; intensities of pixels in the images at different exposure times may be respectively obtained; reliabilities of the pixels in the images at different exposure times may be respectively obtained; the intensities of the corresponding pixels in the images at different exposure times may be respectively multiplied by the corresponding reliabilities, and then the products may be summed, the intensities of pixels in a synthesized image may be obtained, and thus the synthesized image may be generated. An image with abundant details can be generated in real time depending on various embodiments of the present disclosure.

Figure 1:
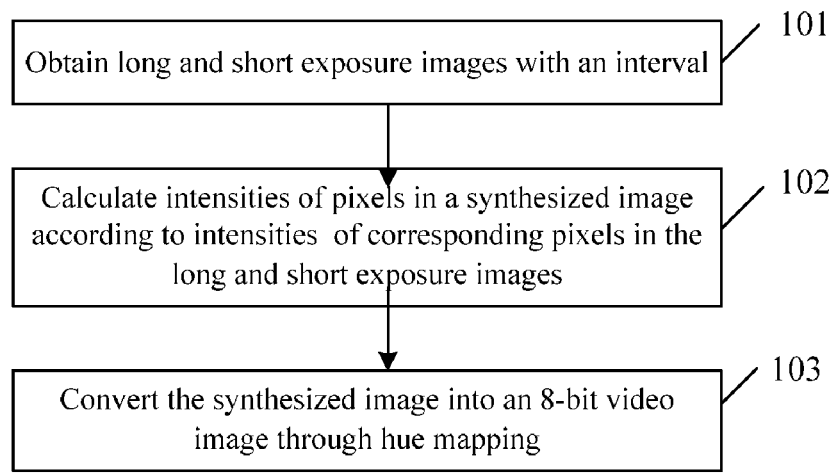
FIG. 1 illustrates a method for magnifying details obtained by an image capturing equipment in the prior art.
Figure 2:
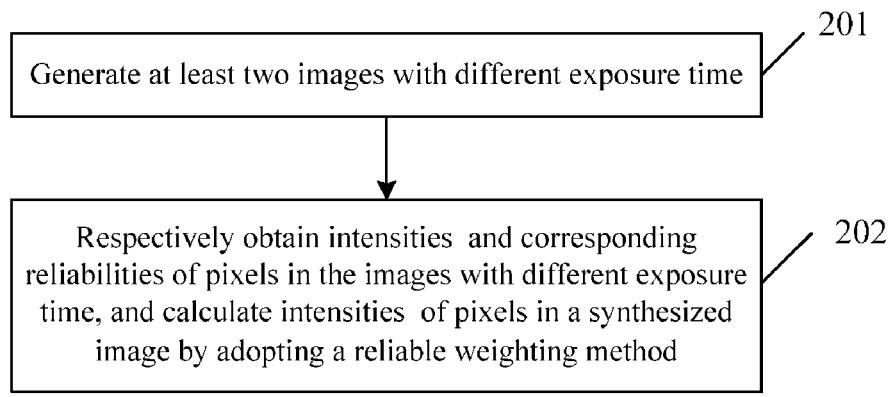
FIG. 2 is a schematic diagram of an embodiment of an image generation method depending on a first embodiment of the present disclosure.

FIG. 2 illustrates an embodiment of disclosure of an image generation method. With reference to block 201, at least two images at different exposure times are generated.

The at least two images at different exposure times may be the images at different exposure times generated in the same scene. It is assumed that in block 201 two images at different exposure times, such as a long exposure image and a short exposure image, are generated, it may be necessary to set a long exposure time and a short exposure time before this process. For example, the specific setting approach may include: obtaining an optimal exposure time in a current scene by using an automatic exposure technique; determining the long exposure time and the short exposure time depending on the optimal exposure time; and alternately setting the exposure time of an image capturing equipment to be the long exposure time and the short exposure time. It is possible to set an absolute exposure time of the long exposure to be twice of the optimal exposure time, and an absolute exposure time of the short exposure to be half of the optimal exposure time. Generally, the image capturing equipment adopts a relative exposure time calculated by the following format:

Relative exposure time=−log$_2$(absolute exposure time).

A long exposure image may be generated in the long exposure time, and a short exposure image may be generated in the short exposure time.

With reference to block 202, intensities and corresponding reliabilities of corresponding pixels in the images at different exposure times are respectively obtained, and intensities of pixels in a synthesized image are calculated by adopting a reliable weighting method, so as to generate the synthesized image with abundant details.

The corresponding pixels in the images at different exposure times are obtained by projecting objective positions in a current scene onto the images at different exposure times. In addition, when the time interval of shooting the images at different exposure times is quite short, alternatively, the current scene is not changed; the corresponding pixels in the images at different exposure times may represent the same physical positions.

The obtained intensities of the pixels in the images at different exposure times may be intensities to be corrected of the pixels in the long and short exposure images, namely the directly obtained intensities of the pixels in the long and short exposure images, or corrected intensities of the pixels in the obtained long and short exposure images, which is the intensities after being made correction of the directly obtained intensities of the pixels in the long and short exposure images.

For the same scene shot with the long and short exposure time, if the overexposed pixels and underexposed pixels are removed, in theory, a ratio of the intensities of the corresponding pixels in the long to short exposure images after being inverse-Gamma corrected should be a ratio of the long to short exposure time. Considering that a response curve of the intensity and a light entering degree of the image capturing equipment is nonlinear, and quantized loss occurs during the process of forming the pixel values, the equivalence relation between the ratio of the intensities of the corresponding pixels to the ratio of the exposure time is apparently inaccurate. The intensities of the corresponding pixels are those as mentioned above to be corrected of the corresponding pixels in the long and short exposure images. Therefore, it is necessary to correct the intensities to be corrected of the corresponding pixels in the long and short exposure images. The intensities to be corrected of the corresponding pixels in the long and short exposure images may be corrected with an average brightness. It is assumed that an average intensity of the pixels in the long exposure image is $\bar{I}_1$, and an average intensity of the pixels in the short exposure image is $\bar{I}_2$.

$$\frac{\bar{I}_1}{\bar{I}_2} = \text{long exposure time/short exposure time} \quad (1)$$

The intensities to be corrected of the pixels in the long and short exposure images are corrected with the average brightness, so as to obtain the corrected intensities ($I_1'$ and $I_2'$) by the following Formula (2):

$$I_1' = I_1 \times (0.5\bar{I}_1 + 0.5\bar{I}_2)/\bar{I}_1$$

$$I_2' = I_2 \times (0.5\bar{I}_1 + 0.5\bar{I}_2)/\bar{I}_2 \quad (2)$$

The two 0.5 in each corrected intensity ($I_1'$ or $I_2'$) in Formula (2) are respectively corresponding average parameter values of the long and short exposure images, and the sum of the corresponding average parameter values of the long and short exposure images may be 1. In addition, $0.5\bar{I}_1 + 0.5\bar{I}_2$ is an integrated intensity. $I_1$ is the intensity of the long exposure image, and $I_2$ is the intensity of the short exposure image.

In some embodiments, the intensities of the pixels in the synthesized image are calculated by adopting the reliable weighting method, and a formula of the reliable weighting method is given below:

$$I_g = w_{g1}(I_1,I_2) \times I_1 + w_{g2}(I_1,I_2) \times I_2 \quad (3)$$

where $w_{g1}(I_1,I_2)$ and $w_{g2}(I_1,I_2)$ represent respectively the reliabilities of the corresponding pixels of the long and short exposure images.

Few details exist in the image regions which are too dark (I is close to 0) or too bright (I is close to 255), therefore the reliabilities of the pixels in those image regions can be decreased. The reliable weighting method may adopt any weight coefficient capable of reflecting the reliability, such as, brightness Gaussian weights generated by a Gaussian function. A formula of the Gaussian function is given below:

$$w = \exp(-(I-128)^2/\sigma) \quad (4)$$

The following Formula (5) is used for generating the brightness Gaussian weights by the Gaussian function:

$$w_{g1}(I_1,I_2) = w_g(I_1)/(w_g(I_1)+w_g(I_2))$$

$$w_{g2}(I_1,I_2) = 1.0 - w_{g1}(I_1,I_2) \quad (5)$$

In order to ensure the continuity of the brightness Gaussian weights, it is possible to perform a Gaussian smoothing on the brightness Gaussian weights in a large scope. The brightness Gaussian weights after the Gaussian smoothing are shown in Formula (6):

$$w_{g1}(I_1,I_2)' = \text{Gussion}(w_g(I_1)/(w_g(I_1)+w_g(I_2)))$$

$$w_{g2}(I_1,I_2)' = 1.0 - w_{g1}(I_1,I_2)' \quad (6)$$

In these embodiments, the reliable weighting method adopting the brightness Gaussian weights after the Gaussian smoothing is shown in Formula (7):

$$I_g = w_{g1}(I_1,I_2)' \times I_1 + w_{g2}(I_1,I_2)' \times I_2 \quad (7)$$

where the intensity I in Formula (7) may be the intensities to be corrected $I_1$ and $I_2$ of the corresponding pixels of the long and short exposure images. Alternatively, the intensity I in Formula (7) may be the corrected intensities $I_1'$ and $I_2'$ of the corresponding pixels of the long and short exposure images. When the corrected intensities $I_1'$ and $I_2'$ of the corresponding pixels of the long and short exposure images are adopted, the reliable weighting method is shown in Formula (8):

$$I_g = w_{g1}(I_1,I_2)' \times I_1 + w_{g2}(I_1,I_2)' \times I_2 \quad (8)$$

By using the above formula, the obtained synthesized image not only maintains its abundant details but also keeps its brightness monotony.

In addition to correcting the intensities to be corrected of the corresponding pixels in the long and short exposure images with the average brightness, it is also possible to correct the intensities to be corrected of the corresponding pixels in the images at different exposure times by adopting other correction methods. For example, Gamma or inverse-Gamma correction method, instead of the average brightness, any correction methods involved above will not affect the implementation of the present disclosure.

Figure 3:
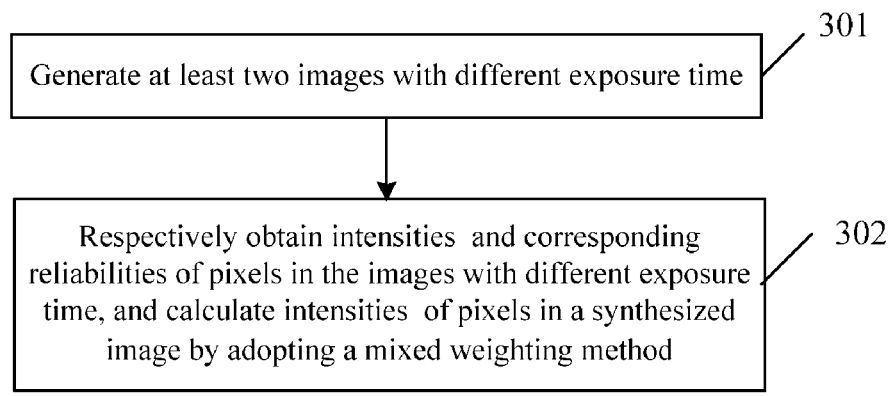
FIG. 3 is a schematic diagram of another embodiment of an image generation method.

FIG. 3 illustrates another embodiment of image generation method. With reference to block 301, at least two images at different exposure times are generated.

With reference to block 302, intensities to be corrected of pixels in the images at different exposure times are obtained and then corrected, so as to get the corrected intensities of the pixels in the images at different exposure times, the correction method may be referred to in the above embodiment. Furthermore, intensities of pixels in a synthesized image are calculated by a constant parameter weighting method, so as to generate a synthesized image with abundant details.

In some embodiments, the formula of the adopted constant parameter weighting method is given below:

$$I_h = \beta_1 I_1 + \beta_2 I_2 \quad (9)$$

The intensities $I_1$ and $I_2$ in Formula (9) are the corrected intensities $I_1'$ and $I_2'$ of the corresponding pixels in the long and short exposure images. $\beta_1$ and $\beta_2$ are respectively the corresponding constant parameters of the corresponding pixels in the long and short exposure images, and the sum of $\beta_1$ and $\beta_2$ may be 1. The obtained $I_h$ is a constant weighted intensity.

By adopting the constant parameter weighting method is that the calculation is relatively simple, and the brightness monotony in the current scene is reserved without requiring additional memory. Therefore, this method can be conveniently implemented.

Figure 4:
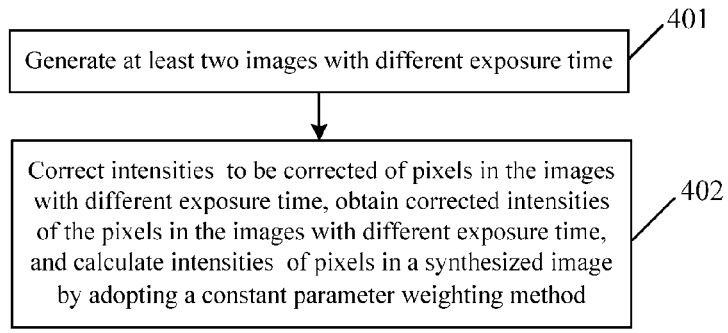
FIG. 4 is a schematic diagram of another embodiment of an image generation method.

FIG. 4 illustrates another yet embodiment of the image generation method. With reference to block 401, at least two images at different exposure times are generated.

With reference to block 402, intensities and corresponding reliabilities of pixels in the images at different exposure times are respectively obtained, and intensities of pixels in a synthesized image are calculated by adopting a mixed weighting method as described in greater detail below, so as to generate a synthesized image with abundant details.

The approaches for obtaining the intensities and the corresponding reliabilities of the pixels in the images at different exposure times are the same as described in the above embodiment with reference to FIG. 2.

The mixed weighting method involves a constant parameter weighting method, specifically, a formula of the constant parameter weighting method is shown in Formula (9):

$$I_h = \beta_1 I_1 + \beta_2 I_2 \quad (9)$$

$I_1$ and $I_2$ in Formula (9) may be the intensities to be corrected $I_1$ and $I_2$ of the corresponding pixels in the long and short exposure images, or the corrected intensities $I_1'$ and $I_2'$ of the corresponding pixels in the long and short exposure images.

More specifically, a calculating formula adopting the mixed weighting method is given below:

$$I = \alpha_2 I_h + \alpha_1 I_g \quad (10)$$

Wherein $I_h$ may be obtained by Formula (9), and $I_g$ may be obtained by Formula (3), (7), or (8). $\alpha_1$ is a first adjustable parameter, $\alpha_2$ is a second adjustable parameter, and the sum of $\alpha_1$ and $\alpha_2$ may be 1. It is verified by experiment that when $\alpha_2 = 0.667$, the brightness of the synthesized image may reach the overall optimal degree of harmony. Meanwhile, the synthesized image maintains its abundant details as well as its brightness monotony.

Figure 5:
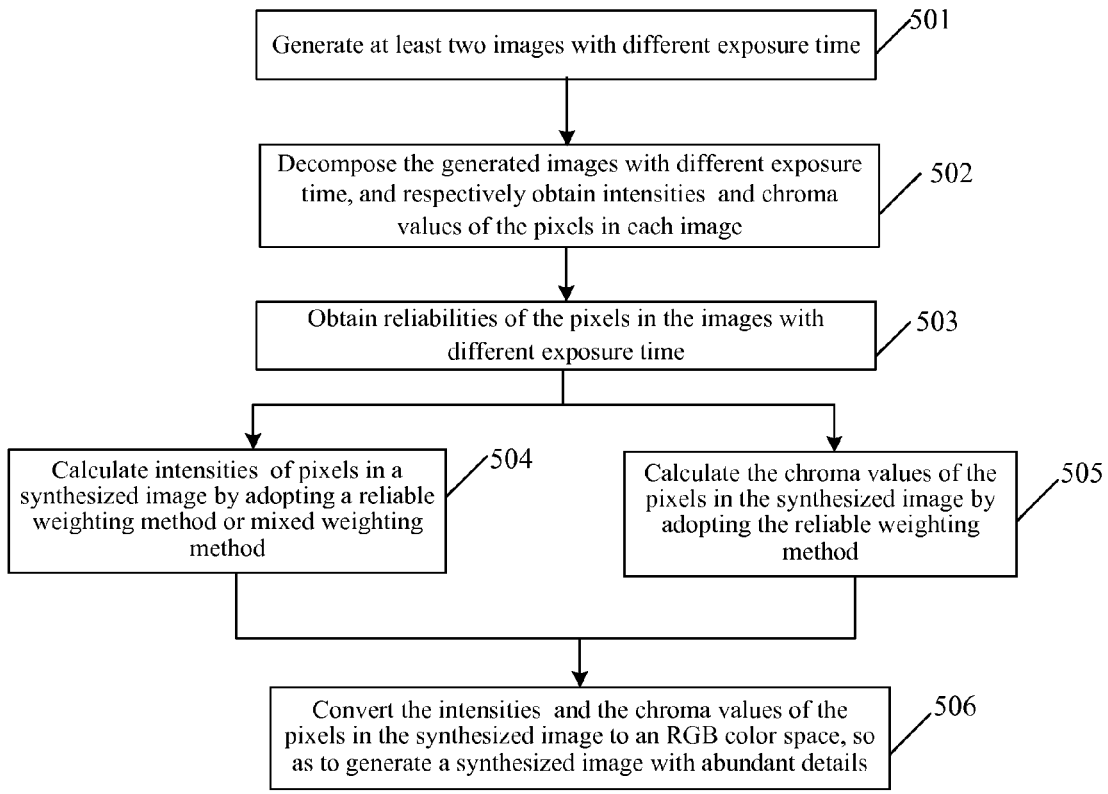
FIG. 5 is a schematic diagram of another embodiment of an image generation method.

FIG. 5 also illustrates an embodiment of an image generation method. With reference to block 501, at least two images at different exposure times are generated.

With reference to block 502, the images generated in different exposure time are decomposed, so as to respectively obtain intensities and chroma values of the pixels in each image.

Specially, a long exposure image is converted to a YCrCb space, so as to obtain an intensity Y1 and chroma values Cr1 and Cb1 through decomposition. Meanwhile, a short exposure image is converted to a YCrCb space, so as to obtain an intensity Y2 and chroma values Cr2 and Cb2 through decomposition.

Considering that the human eyes are quite sensitive to the brightness, unnatural change of the brightness may cause serious comfortlessness to the human eyes, and the requirements of the human eyes on chromaticity are saturated, sharp, and strongly contrasted. Therefore, in such cases, disclosure the brightness and the chromaticity of the image are separated, the intensities and the chroma values of the corresponding pixels are respectively synthesized through different synthesis methods, which will be described as below.

With reference to block 503, reliabilities of the pixels in the images at different exposure times are obtained.

Wherein the approach of obtaining the reliabilities of the pixels in the images at different exposure times is the same as described in the above embodiment referring to FIG. 2.

With reference to block 504, the intensity Y of the pixels in the synthesized image is calculated by adopting the reliable weighting method or the mixed weighting method.

More specifically, if the reliable weighting method is adopted, the implementing approach may refer to the above embodiment with reference to FIG. 2, and if the mixed weighting method is adopted, the implementing approach may refer to the above embodiment with reference to FIG. 3.

With reference to block 505, the chroma values Cr and Cb of the pixels in the synthesized image are calculated by adopting the reliable weighting method.

Specially, the chroma values Cr and Cb of the pixels in the synthesized image are calculated by Formula (11) as follows:

$$C_r = w_{g1}(I_1, I_2) \times Cr_1 + w_{g2}(I_1, I_2) \times Cr_2$$

$$C_b = w_{g1}(I_1, I_2) \times Cb_1 + w_{g2}(I_1, I_2) \times Cb_2 \quad (11)$$

The two processes described with reference to block 504 and block 505 may be in parallel or in sequence, which will not affect the implementation of the present disclosure.

With reference to block 506, the intensities and the chroma values of the pixels in the synthesized image obtained by calculation are converted to an RGB color space, so as to generate a synthesized image with abundant details.

In addition to converting the images at different exposure times to YCrCb space, it may also be possible to convert the images at different exposure times to a YUV space for the decomposition of the brightness and chroma, which still will not affect the implementation of the present disclosure.

Alternatively, the process with reference to block 504 may be to correct the intensities to be corrected of the pixels in the images at different exposure times, to obtain the corrected intensities of the pixels and calculate the intensities of the pixels in the synthesized image by adopting the constant parameter weighting method. In such cases, the entire implementing process may refer to the above embodiment with reference to FIG. 3.

Generally, the images at different exposure times may be generated by an image capturing module, and the synthesized image may be generated via an image synthesis module by using the images at different exposure times. However, in practice, the image capturing module and the image synthesis module may be located on different physical entities, and the generated images at different exposure times may be transmitted to the image synthesis module. Accordingly, there is another process between the process of generating the images at different exposure times and the process of generating the synthesized image by using the images at different exposure times, such process further includes combining and transmitting a long and short exposure image pair.

An example is given below for describing the process of combining and transmitting the long and short exposure images pair. A first long exposure image generated in the current scene and an initially set short exposure image are combined into a long and short exposure image pair to be output. A first short exposure image generated in the current scene and the first long exposure image are combined into a long and short exposure image pair to be output. A regenerated second long exposure image and the first short exposure image are combined into a long and short exposure image pair to be output. A regenerated second short exposure image and the second long exposure image are combined into a long and short exposure image pair to be output. The rest can be deduced accordingly. In addition, the long and short exposure image pair combined by the first long exposure image generated in the current scene and the initially set short exposure image is inaccurate, and may be discarded.

An output frequency of the long and short exposure image pair is a smaller value of an output image frame rate and an exposure time change frequency of the capturing equipment. Specially, the exposure time change frequency of the capturing equipment is the times of exposure changes made by the capturing equipment in a unit time, the output image frame rate of the capturing equipment is equal to a frequency of reading a CMOS/CCD. Generally, the output image frame rate of the capturing equipment is quite large, such that the output frequency of the long and short exposure image pair usually adopts the exposure time change frequency of the capturing equipment.

Those of ordinary skill in the art should understand that all or a part of the processes in the method of the above embodiment can be realized by instructing relative hardware with programs. The programs may be stored in a computer readable storage medium, such as a read only memory (ROM), a magnetic disk, or an optical disk.

Figure 6:
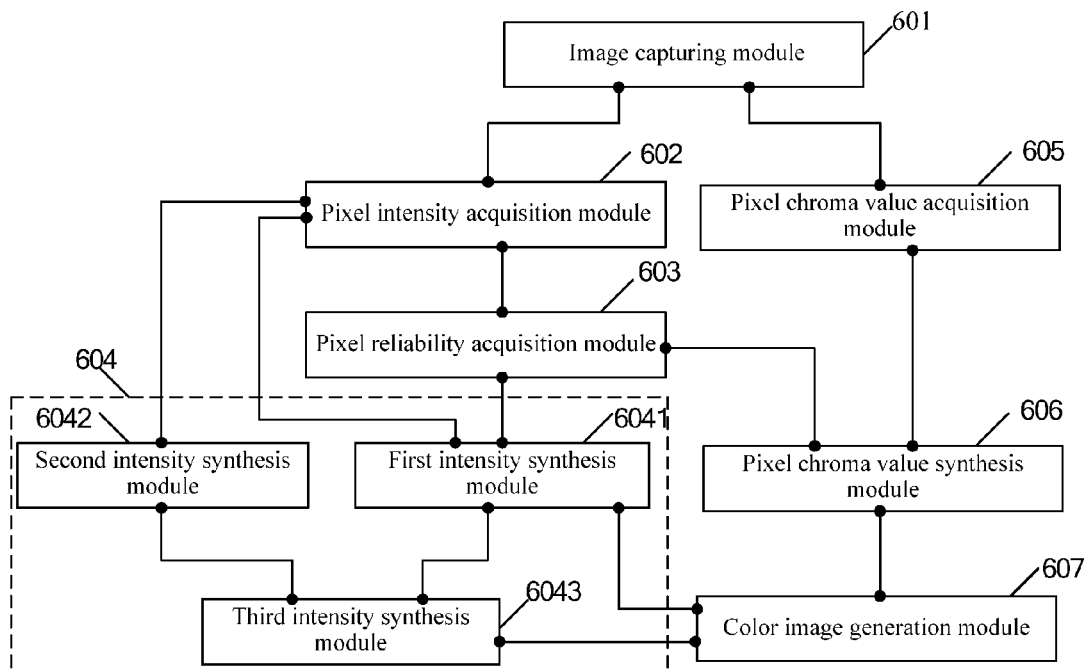
FIG. 6 is a schematic diagram of an embodiment of an image generation device.

FIG. 6 illustrates an embodiment of an image generation device including an image capturing module 601, a pixel intensity acquisition module 602, a pixel reliability acquisition module 603, and a pixel intensity synthesis module 604.

The image capturing module 601 may be configured to generate at least two images at different exposure times.

The pixel intensity acquisition module 602 may be configured to obtain intensities of pixels in the images at different exposure times. Specially, the obtained intensities of the pixels may be intensities to be corrected of the pixels in the images at different exposure times, or the corrected intensities of the pixels in the images at different exposure times.

The pixel reliability acquisition module 603 may be configured to obtain reliabilities of the pixels in the images at different exposure times. The sum of the reliabilities of the pixels in the images at different exposure times may be 1. This module may obtain Gaussian weights of the intensities of the pixels in the images at different exposure times as reliabilities by adopting a Gaussian function.

The pixel intensity synthesis module 604 may be configured to obtain an intensity of the pixels in a synthesized image depending on the intensities and the reliabilities of the pixels in the images at different exposure times, which may include a first intensity synthesis module 6041, a second intensity synthesis module 6042, and a third intensity synthesis module 6043.

The first intensity synthesis module 6041 may be configured to respectively multiply the intensities of the corresponding pixels in the images at different exposure times by the corresponding reliabilities, and then sum the products.

The second intensity synthesis module 6042 may be configured to respectively multiply the intensities of the corresponding pixels in the images at different exposure times by the corresponding constant parameters, so as to obtain a constant parameter weighted intensity. The sum of the corresponding constant parameters of the pixels of the images at different exposure times is 1.

The third intensity synthesis module 6043 may be configured to multiply the constant parameter weighted intensity in the second intensity synthesis module 6042 by the second adjustable parameter, then multiply the sum of the respective products of the intensities of the corresponding pixels and the corresponding reliabilities in the first intensity synthesis module 6041 by the first adjustable parameter, and finally sum the above two products to obtain intensities of the pixels in the synthesized image.

With reference to FIG. 6, the image generation device may further include a pixel chroma value acquisition module 605, a pixel chroma value synthesis module 606, and a color image generation module 607.

The pixel chroma value acquisition module 605 may be configured to obtain chroma values of the pixels in the images at different exposure times.

The pixel chroma value synthesis module 606 may be configured to respectively multiply the chroma values of the corresponding pixels in the images at different exposure times by the corresponding reliabilities, and then sum the products, so as to obtain chroma values of the pixels in the synthesized image.

The color image generation module 607 may be configured to convert the intensities and chroma values in the synthesized image to an RGB space, so as to generate a color image.

Figure 7:
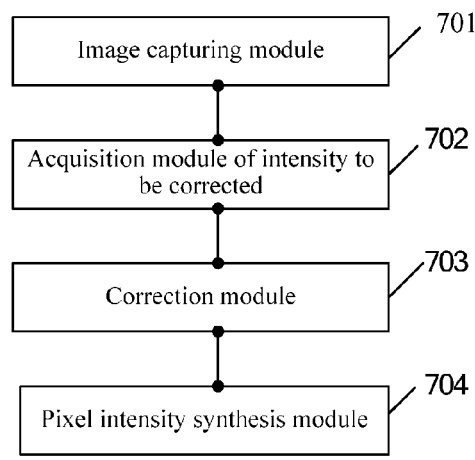
FIG. 7 is a schematic diagram of another embodiment of an image generation device.

FIG. 7 illustrates another embodiment of an image generation device including an image capturing module 701, an acquisition module of intensity to be corrected 702, a correction module 703, and a pixel intensity synthesis module 704.

The image capturing module 701 may be configured to generate at least two images at different exposure times.

The acquisition module of intensity to be corrected 702 may be configured to respectively obtain intensities to be corrected of pixels in the images at different exposure times.

The correction module 703 may be configured to respectively correct the intensities to be corrected of the pixels in the images at different exposure times, so as to obtain corrected intensities of the pixels in the images at different exposure times.

The pixel intensity synthesis module 704 may be configured to respectively multiply the corrected intensities of the corresponding pixels in the images at different exposure times by corresponding constant parameters, and then sum the products, so as to obtain intensities of pixels in a synthesized image.

FIG. 8 illustrates yet another embodiment of an image synthesis equipment including a pixel intensity acquisition module 801, a pixel reliability acquisition module 802, and a pixel intensity synthesis module 803.

The pixel intensity acquisition module 801 may be configured to respectively obtain intensities of pixels in images at different exposure times.

The pixel reliability acquisition module 802 may be configured to respectively obtain reliabilities of the pixels in the images at different exposure times.

The pixel intensity synthesis module 803 may be configured to obtain an intensity of the pixels in a synthesized image depending on the intensities and the reliabilities of the pixels in the images at different exposure times, which may include a first intensity synthesis module 8031, a second intensity synthesis module 8032, and a third intensity synthesis module 8033.

The first intensity synthesis module 8031 may be configured to respectively multiply the intensities of the corresponding pixels in the images at different exposure times by the corresponding reliabilities, and then sum the products, so as to obtain intensities of pixels in a synthesized image.

The second intensity synthesis module 8032 may be configured to respectively multiply the intensities of the corresponding pixels in the images at different exposure times by the corresponding constant parameters, and then sum the products, so as to obtain a constant parameter weighted intensity. The sum of the corresponding constant parameters of the pixels of the images at different exposure times is 1.

The third intensity synthesis module 8033 may be configured to multiply the sum of the products obtained in the first intensity synthesis module 8031 by the first adjustable parameter, then multiply the constant parameter weighted intensity by the second adjustable parameter, and finally sum the above two products to obtain intensities of the pixels in the synthesized image. In addition, the sum of the first adjustable parameter and the second adjustable parameter is 1.

With reference to FIG. 8, the image synthesis equipment may further include a pixel chroma value acquisition module 804, a pixel chroma value synthesis module 805, and a color image generation module 806.

The pixel chroma value acquisition module 804 may be configured to obtain chroma values of the pixels in the images at different exposure times.

The pixel chroma value synthesis module 805 may be configured to respectively multiply the chroma values of the corresponding pixels in the images at different exposure times by the corresponding reliabilities, and then sum the products, so as to obtain chroma values of the pixels in the synthesized image.

The color image generation module 806 may be configured to convert the intensities and chroma values in the synthesized image to an RGB space, so as to generate a color image.

Seen from the above analysis, the embodiments of the present disclosure may achieve the following beneficial effects.

In the embodiment of the present disclosure, reliabilities of the pixels in the images at different exposure times are respectively obtained. The reliabilities of the corresponding pixels in the images at different exposure times are respectively multiplied by the corresponding intensities, and then the products are summed, so as to obtain intensities of the pixels in a synthesized image. In the synthesized image, the method for calculating the intensities of the pixels is simple and has a small amount of calculation. Meanwhile, the sum of the reliabilities of the corresponding pixels in the images at different exposure times is around 1, so the intensities of the pixels in the obtained synthesized image may be numerical values in a range of 0 to 255. Therefore, it is possible to directly display the synthesized image on a common display without performing the hue mapping, and generate a video image in real time. FIG. 9 shows experimental results generated by a Logitech camera pro5000 (size: 320×240 pixels) depending on an embodiment of the present disclosure. It can be clearly seen from the figure that it is possible to obtain an image with abundant details by adopting the technical schemes provided in the embodiments of the present disclosure.

In the embodiment of the present disclosure, intensities to be corrected of the pixels in the images at different exposure times are respectively corrected, so as to obtain the corrected intensities of the pixels in the images at different exposure times. Then, the corrected intensities of the corresponding pixels in the images at different exposure times are respectively multiplied by corresponding constant parameters, so as to obtain intensity of pixels in a synthesized image. As the sum of the corresponding constant parameters of the pixels in the technical scheme may be 1, the intensities of the pixels in the obtained synthesized image may be numerical values in a range of 0 to 255. Therefore, it is possible to directly display the synthesized image on a common display without performing the hue mapping. Besides, the amount of correction calculation on the intensities to be corrected of the pixels in the images at different exposure times is quite small, and thus a video image can be generated in real time.

Depending on the technical schemes provided in the embodiments of the present disclosure, an image with abundant details can be generated by using additional software modules without changing the current structure of the image capturing equipment. Particularly, in a shooting scene with a large brightness range, the details of the current scene can be clearly obtained. Moreover, the present disclosure has a great expandability, and is simple and convenient for later upgrading.

In the embodiment of the present disclosure, after the images at different exposure times are generated by the image capturing module, a long and short exposure image pair is combined to be output. An output frequency of the long and short exposure image pair is a smaller value of an output image frame rate and an exposure time change frequency of the capturing equipment. The output image frame rate of the capturing equipment is usually quite large, such that the output frequency of the long and short exposure image pair is usually the exposure time change frequency of the capturing equipment, and the output frame rate of the image capturing equipment may not be lowered.

Though illustration and description of the present disclosure have been given with reference to preferred embodiments thereof, it should be appreciated by persons of ordinary skill in the art that various changes in forms and details can be made without deviation from the spirit and scope of this disclosure, which are defined by the appended claims.

What is claimed is:

1. A method for generating an image, comprising:
generating at least two images at different exposure times;
obtaining intensities of pixels in the images at different exposure times respectively, wherein the intensities of the pixels in the images at different exposure times are intensities to be corrected or corrected intensities;
obtaining reliabilities of the pixels in the images at different exposure times respectively;
obtaining an intensity of the pixels in a synthesized image depending on the intensities and the reliabilities of the pixels in the images at different exposure times; and
generating an image depending on the intensity of the pixels in the synthesized image,
wherein the process of obtaining the corrected intensities comprises:
obtaining the intensities to be corrected of the pixels in the images at different exposure times respectively;
obtaining average intensities of the pixels in the images at different exposure times respectively;
multiplying the average intensities by corresponding average parameter values respectively, and summing the products obtained by multiplying the average intensities by the corresponding average parameter values respectively, to obtain an integrated intensity, wherein a sum of the corresponding average parameter values is 1; and
multiplying the intensities to be corrected by the integrated intensity, and dividing by the corresponding average parameter values respectively, to obtain the corrected intensities of the pixels in the images at different exposure times.

2. The method of claim 1, wherein the process of generating at least two images at different exposure times further comprises:
setting a long exposure time and a short exposure time; and
generating a long exposure image in the long exposure time and a short exposure image in the short exposure time.

3. The method of claim 1, wherein the process of obtaining an intensity of the pixels in a synthesized image depending on the intensities and the reliabilities of pixels in the images at different exposure times further comprises:
multiplying the intensities of the pixels in the images at different exposure times by the corresponding reliabilities respectively and summing the products obtained by multiplying the intensities of the pixels in the images at different exposure times by the corresponding reliabilities respectively to obtain the intensity of the pixels in a synthesized image.

4. The method of claim 3, wherein the process of obtaining intensities of pixels in the images at different exposure times respectively further comprises:
multiplying intensities of the pixels in the images at different exposure times by corresponding constant parameters respectively and summing the products obtained by multiplying the intensities of the pixels in the images at different exposure times by the corresponding constant parameters respectively to obtain a constant parameter weighted intensity;
wherein the sum of the constant parameters of the pixels in the images at different exposure times is 1;
multiplying the constant parameter weighted intensity by a first adjustable parameter; and
wherein the process of multiplying the intensities of the pixels in the images at different exposure times by the corresponding reliabilities respectively and summing the products obtained by multiplying the intensities of the pixels in the images at different exposure times by the corresponding reliabilities respectively to obtain the intensity of the pixels in a synthesized image further comprises:
multiplying the intensity of the pixels in a synthesized image by a second adjustable parameter, and summing the product obtained by the process of multiplying the constant parameter weighted intensity by the first adjustable parameter to obtain the intensity of the pixels in a synthesized image;
wherein the sum of the first adjustable parameter and the second adjustable parameter is 1.

5. The method of claim 1, further comprising:
obtaining chroma values of the pixels in the images at different exposure times respectively;
multiplying the chroma values of pixels in the images at different exposure times by corresponding reliabilities respectively, and summing the products obtained by multiplying the chroma values of pixels in the images at different exposure times by the corresponding reliabilities respectively to obtain a chroma value of the pixels in the synthesized image; and
wherein the process of generating an image depending on the intensity of the pixels in a synthesized image further comprising:
converting the intensity of the pixels in the synthesized image and the chroma value to an RGB color space to generate an image.

6. A computer readable non-transitory storage medium, comprising computer readable instructions that when executed by a computer unit, will cause the computer unit to perform the method according to claim 1.

7. The method of claim 1, further comprising obtaining brightness Gaussian weights of the pixels in the images at different exposure times by a Gaussian function as reliabilities of the pixels in the images at different exposure times respectively.

8. A method for generating an image, comprising:
generating at least two images at different exposure times;
obtaining intensities to be corrected of pixels in the images at different exposure times respectively;
obtaining average intensities of the pixels in the images at different exposure times respectively;
multiplying the average intensities of the pixels in the images at different exposure times by corresponding average parameter values respectively, and summing products obtained by multiplying the average intensities of the pixels in the images at different exposure times by the corresponding average parameter values respectively to obtain an integrated intensity;
wherein the sum of the corresponding average parameter values is 1;
multiplying the intensities to be corrected of the pixels in the images at different exposure times by the integrated intensity, and dividing the products obtained by multiplying the intensities to be corrected of the pixels in the images at different exposure times by the integrated intensity by the corresponding average parameter values respectively to obtain corrected intensities of the pixels in the images at different exposure times;
obtaining an intensity of the pixels in a synthesized image depending on the corrected intensities of the pixels in the images at different exposure times; and
generating an image depending on the intensity of the pixels in the synthesized image.

9. The method of claim 8, wherein the process of obtaining an intensity of the pixels in a synthesized image depending on the corrected intensities of the pixels in the images at different exposure times further comprising:
multiplying the corrected intensities of the pixels in the images at different exposure times by corresponding constant parameters, and summing the products obtained by multiplying the corrected intensities of the pixels in the images at different exposure times by the corresponding constant parameters to obtain an intensity of the pixels in a synthesized image.

10. The method of claim 8, further comprising:
obtaining reliabilities of the pixels in the images at different exposure times respectively;
obtaining chroma values of the pixels in the images at different exposure times respectively;
multiplying the chroma values of pixels in the images at different exposure times by corresponding reliabilities respectively, and summing the products obtained by multiplying the chroma values of pixels in the images at different exposure times by the corresponding reliabilities respectively to obtain a chroma value of the pixels in the synthesized image; and
wherein the process of generating an image depending on the intensity of the pixels in the synthesized image further comprising:
converting the chroma value of the pixels in the synthesized image and the corresponding intensity of the pixels in the synthesized image to an RGB color space to generate an image.

11. A computer readable non-transitory storage medium, comprising computer readable instructions that when executed by a computer unit, will cause the computer unit to perform the method according to claim 8.

12. An image generation device, comprising:
an image capturing module, configured to generate at least two images at different exposure times;
a pixel intensity acquisition module, configured to obtain intensities of pixels in the images at different exposure times, wherein the intensities of the pixels in the images at different exposure times are intensities to be corrected or corrected intensities;
a pixel reliability acquisition module, configured to obtain reliabilities of the pixels in the images at different exposure times; and
a pixel intensity synthesis module, configured to obtain an intensity of the pixels in a synthesized image depending on the intensities and the reliabilities of the pixels in the images at different exposure times,
wherein the pixel intensity acquisition module is configured to obtain the corrected intensities by:
obtaining the intensities to be corrected of the pixels in the images at different exposure times respectively;
obtaining average intensities of the pixels in the images at different exposure times respectively;
multiplying the average intensities by corresponding average parameter values respectively, and summing the products obtained by multiplying the average intensities by the corresponding average parameter values respectively, to obtain an integrated intensity, wherein a sum of the corresponding average parameter values is 1; and
multiplying the intensities to be corrected by the integrated intensity, and dividing by the corresponding average parameter values respectively, to obtain the corrected intensities of the pixels in the images at different exposure times,
wherein each of the image capturing module, the pixel intensity acquisition module, the pixel reliability acquisition module, and the pixel intensity synthesis module includes a processor.

13. The image generation device of claim 12, further comprising:
a pixel chroma value acquisition module, configured to obtain chroma values of the pixels in the images at different exposure times;
a pixel chroma value synthesis module, configured to multiply the chroma values of the corresponding pixels in the images at different exposure times by the corresponding reliabilities respectively and sum the products obtained by multiplying the chroma values of the corresponding pixels in the images at different exposure times by the corresponding reliabilities respectively to obtain chroma values of the pixels in the synthesized image; and
a color image generation module, configured to convert the intensities and the chroma values in the synthesized image to an RGB space to generate an image.

14. The image generation device of claim 12, wherein the pixel intensity synthesis module comprising:
a first intensity synthesis module, configured to multiply the intensities of the pixels in the images at different exposure times by the corresponding reliabilities respectively and sum the products obtained by multiplying the intensities of the pixels in the images at different exposure times by the corresponding reliabilities respectively to obtain an intensity of the pixels in a synthesized image.

15. The image generation device of claim 14, further comprising:
a second intensity synthesis module, configured to multiply the intensities of the corresponding pixels in the images at different exposure times by corresponding constant parameters respectively and sum the products obtained by multiplying the intensities of the corresponding pixels in the images at different exposure times by the corresponding constant parameters respectively to obtain a constant parameter weighted intensity;

wherein the sum of the constant parameters of pixels in the images at different exposure times is 1; and a third intensity synthesis module, configured to multiply the constant parameter weighted intensity by a first adjustable parameter, multiply the intensity of the pixels in a synthesized image obtained by the first intensity synthesis module by a second adjustable parameter, and sum the two products to obtain an intensity of the pixels in the synthesized image;

wherein the sum of the first adjustable parameter and the second adjustable parameter is 1.

16. The image generation device of claim 12, further comprising a pixel reliability acquisition module, configured to obtain brightness Gaussian weights of the pixels in the images at different exposure times by a Gaussian function as reliabilities of the pixels in the images at different exposure times.

17. An image generation device, comprising:
an image capturing module, configured to generate at least two images at different exposure times;
an acquisition module of intensity to be corrected, configured to respectively obtain intensities to be corrected of pixels in the images at different exposure times;
a correction module, configured to obtain average intensities of the pixels in the images at different exposure times respectively; multiply the average intensities of the pixels in the images at different exposure times by corresponding average parameter values respectively, and sum products obtained by multiplying the average intensities of the pixels in the images at different exposure times by the corresponding average parameter values respectively to obtain an integrated intensity; wherein the sum of the corresponding average parameter values is 1; multiply the intensities to be corrected of the pixels in the images at different exposure times by the integrated intensity, and divide the products obtained by multiplying the intensities to be corrected of the pixels in the images at different exposure times by the integrated intensity by the corresponding average parameter values respectively to obtain corrected intensities of the pixels in the images at different exposure times; and
a pixel intensity synthesis module, configured to multiply the corrected intensities of the corresponding pixels in the images at different exposure times by corresponding constant parameters respectively, and sum the products obtained by multiplying the corrected intensities of the corresponding pixels in the images at different exposure times by the corresponding constant parameters respectively to obtain an intensity of the pixels in a synthesized image,
wherein each of the image capturing module, the acquisition module, the correction module, and the pixel intensity synthesis module includes a processor.

18. An image synthesis device, comprising:
a pixel intensity acquisition module, configured to obtain intensities of pixels in the images at different exposure times, wherein the intensities of the pixels in the images at different exposure times are intensities to be corrected or corrected intensities, and the pixel intensity acquisition module is configured to obtain the corrected intensities by:

obtaining the intensities to be corrected of the pixels in the images at different exposure times respectively;
obtaining average intensities of the pixels in the images at different exposure times respectively;
multiplying the average intensities by corresponding average parameter values respectively, and summing the products obtained by multiplying the average intensities by the corresponding average parameter values respectively, to obtain an integrated intensity, wherein a sum of the corresponding average parameter values is 1; and
multiplying the intensities to be corrected by the integrated intensity, and dividing by the corresponding average parameter values respectively, to obtain the corrected intensities of the pixels in the images at different exposure times;
a pixel reliability acquisition module, configured to obtain reliabilities of the pixels in the images at different exposure times; and
a pixel intensity synthesis module, configured to multiply intensities of the pixels in the images at different exposure times by the corresponding reliabilities respectively and sum the products obtained by multiplying the intensities of the pixels in the images at different exposure times by the corresponding reliabilities respectively to obtain an intensity of the pixels in a synthesized image,
wherein each of the pixel intensity acquisition module, the pixel reliability acquisition module, and the pixel intensity synthesis module includes a processor.

19. The image synthesis device of claim 18, further comprising:
a pixel chroma value acquisition module, configured to obtain chroma values of the pixels in the images at different exposure times;
a pixel chroma value synthesis module, configured to multiply the chroma values of the corresponding pixels in the images at different exposure times by the corresponding reliabilities respectively and sum the products obtained by multiplying the chroma values of the corresponding pixels in the images at different exposure times by the corresponding reliabilities respectively to obtain chroma values of the pixels in the synthesized image; and
a color image generation module, configured to convert the intensities and the chroma values in the synthesized image to an RGB space to generate an image.

20. The image synthesis device of claim 18, wherein the pixel intensity synthesis module comprises:
a first intensity synthesis module, configured to multiply the intensities of the corresponding pixels in the images at different exposure times by the corresponding reliabilities respectively and sum the products obtained by multiplying the intensities of the corresponding pixels in the images at different exposure times by the corresponding reliabilities respectively to obtain an intensity of the pixels in a synthesized image.

21. The image synthesis device of claim 20, further comprising:
a second intensity synthesis module, configured to respectively multiply the intensities of the corresponding pixels in the images at different exposure times by corresponding constant parameters and sum the products obtained by multiplying the intensities of the corresponding pixels in the images at different exposure times by the corresponding constant parameters to obtain a constant parameter weighted intensity;
wherein the sum of the constant parameters of pixels in the images at different exposure times is 1; and a third intensity synthesis module, configured to multiply the constant parameter weighted intensity by a first adjustable parameter, multiply the intensity of the pixels in a synthesized image obtained by the first intensity synthesis module by a second adjustable parameter, and sum the two products to obtain an intensity of the pixels in the synthesized image;

wherein the sum of the first adjustable parameter and the second adjustable parameter is 1.

22. The image synthesis device of claim 18, further comprising a pixel reliability acquisition module, configured to obtain brightness Gaussian weights of the pixels in the images at different exposure times by a Gaussian function as reliabilities of the pixels in the images at different exposure times.

* * * * *